US009258667B2

(12) United States Patent
Seshadri

(10) Patent No.: US 9,258,667 B2
(45) Date of Patent: Feb. 9, 2016

(54) DEVICE WITH MULTIPLE CUE MODULES

(71) Applicant: BROADCOM CORPORATION, Irvine, CA (US)

(72) Inventor: Nambirajan Seshadri, Irvine, CA (US)

(73) Assignee: BROADCOM CORPORATION, IRVINE, CA (US)

( * ) Notice: Subject to any disclaimer, the term of this patent is extended or adjusted under 35 U.S.C. 154(b) by 233 days.

(21) Appl. No.: 13/921,392

(22) Filed: Jun. 19, 2013

(65) Prior Publication Data

US 2013/0281069 A1  Oct. 24, 2013

Related U.S. Application Data

(63) Continuation of application No. 12/627,881, filed on Nov. 30, 2009, now Pat. No. 8,495,152.

(60) Provisional application No. 61/246,272, filed on Sep. 28, 2009.

(51) Int. Cl.
| | |
|---|---|
| G06F 15/16 | (2006.01) |
| H04W 4/00 | (2009.01) |
| H04M 1/725 | (2006.01) |
| H04W 4/04 | (2009.01) |
| H04W 4/02 | (2009.01) |

(52) U.S. Cl.
CPC ............ *H04W 4/00* (2013.01); *H04M 1/72569* (2013.01); *H04W 4/043* (2013.01); *H04M 1/72572* (2013.01); *H04M 2250/10* (2013.01); *H04W 4/027* (2013.01)

(58) Field of Classification Search
CPC .. G06F 17/30864; G06F 3/0484; H04L 67/18
USPC .................................................. 709/204, 206
See application file for complete search history.

(56) References Cited

U.S. PATENT DOCUMENTS

2007/0287473 A1* 12/2007 Dupray ...................... 455/456.1
2010/0235756 A1*  9/2010 Yoshihama .................... 715/745

* cited by examiner

*Primary Examiner* — Wing F Chan
*Assistant Examiner* — Andrew Woo
(74) *Attorney, Agent, or Firm* — Garlick & Markison; Randy W. Lacasse

(57) ABSTRACT

A device includes a primary cue module, a secondary cue module, a processing module, and a wireless transceiver. The primary cue module obtains primary data regarding an object of interest and the secondary cue module obtains secondary data regarding the object of interest. The processing module is operably coupled to: convert the primary data and the secondary data into an outbound message; convert the outbound message into an outbound symbol stream; and convert an inbound symbol stream into an inbound message, wherein the inbound message includes information regarding the object of interest. The wireless transceiver is operably coupled to: convert the outbound symbol stream into an outbound wireless signal; and convert an inbound wireless signal into the inbound symbol stream.

20 Claims, 8 Drawing Sheets

DEVICE WITH MULTIPLE CUE MODULES

CROSS REFERENCE TO PRIORITY APPLICATIONS INCORPORATION BY REFERENCE

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility application Ser. No. 12/627,881, entitled "Device With Multiple Cue Modules," filed Nov. 30, 2009, pending, which claims priority pursuant to 35 U.S.C. §119(e) to the following U.S. Provisional Patent Application which is hereby incorporated herein by reference in its entirety and made part of the present U.S. Utility Patent Application for all purposes:
   a. U.S. Provisional Application Ser. No. 61/246,272, entitled "Device With Multiple Cue Modules," filed Sep. 28, 2009, now expired.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to wireless communication systems and more particularly to data processing within such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), WCDMA, LTE (Long Term Evolution), WiMAX (worldwide interoperability for microwave access), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers data from the filtered signals in accordance with the particular wireless communication standard.

As is also known, the transmitter includes a data modulation stage, one or more intermediate frequency stages, and a power amplifier. The data modulation stage converts data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Such wireless communication devices are offering more and more services. For example, current cell phones offer a suite of downloadable applications that range from flashlights, to compasses, to navigation systems, to games, to social networking, to music, to utilities, to references, etc. Most, if not all, of these applications contained predetermined information. That is, if a user knows what he or she is looking for and enters the appropriate input commands, the user can obtain a desired answer. In situations where the user encounters a person, place, or thing of interest and wants to obtain information regarding the person, place, or thing, portable device accessible databases and/or other applications, if they exist, are cumbersome to use.

Therefore, a need exists for obtaining information regarding an object of interest via a portable device.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
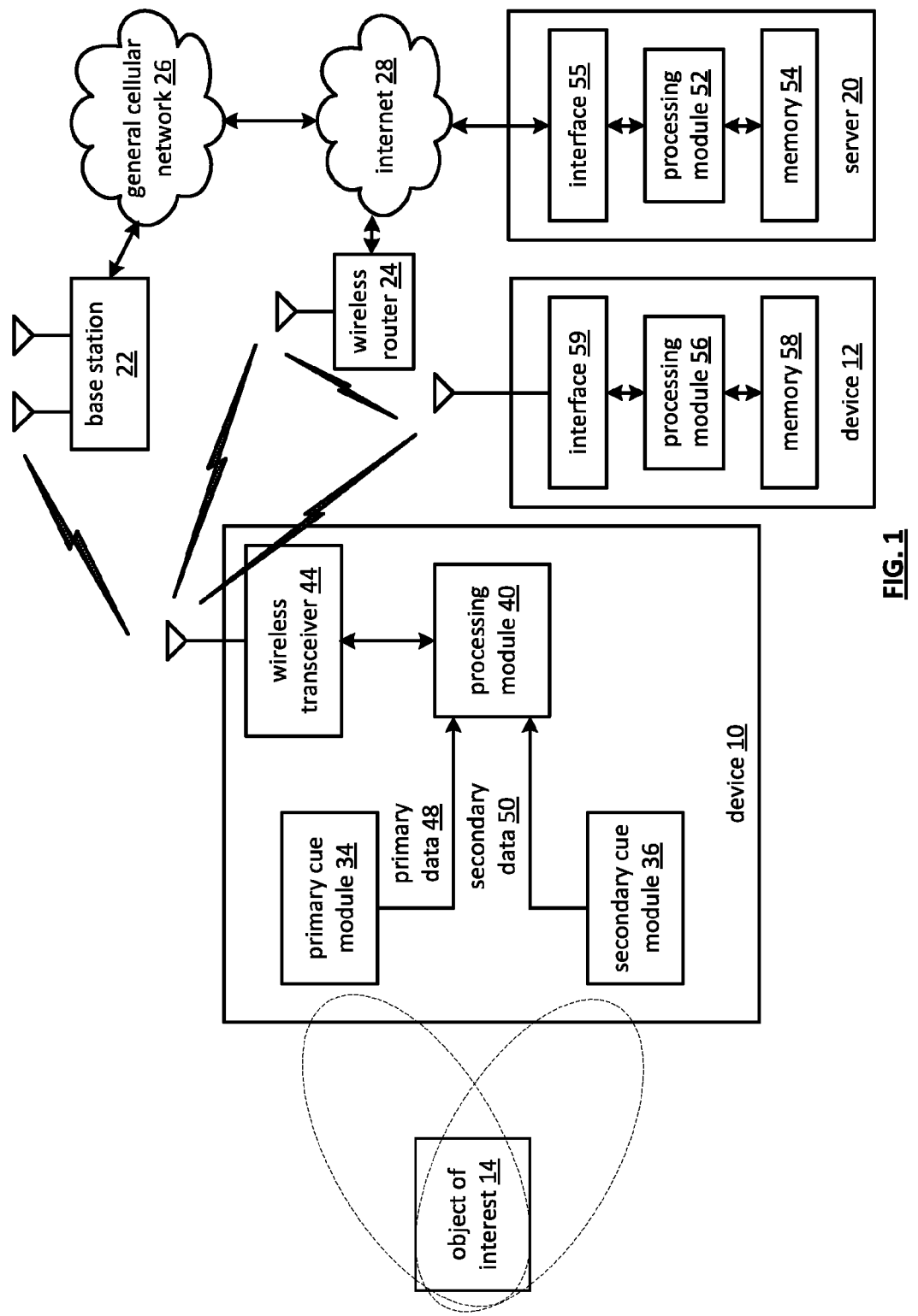
FIG. 1 is a schematic block diagram of an embodiment of a system in accordance with the present invention.

FIG. 1 is a schematic block diagram of an embodiment of a system in which a device 10 may obtain information regarding an object of interest 14 from another device 12 and/or from a server 20. The device 10 may communicate with the other device 12 and/or the server 20 via a direct wireless connection, via a wireless router 24, via a cellular telephone base station 22, via a general cellular network 26, and/or via the internet 28. Note that the server 20 may alternatively be coupled to the wireless router to provide a local area network server or coupled to the general cellular network 26 to enable a cell phone carrier to provide information services regarding objects of interest. Further note that the system may include a plurality of servers for responding to requests for information regarding an object of interest. For example, one or more servers may support requests for information regarding persons; one or more servers may support requests for information regarding building; one or more servers may support requests for information regarding landmarks; one or more servers may support requests for information regarding things; one or more servers may support requests for information regarding mammals (e.g., birds, domestic animals, wild animals, etc.); one or more servers may support requests for information regarding insects; one or more servers may support requests for information regarding plants; one or more servers may support requests for information regarding reptiles; one or more servers may support requests for information regarding fish; one or more servers may support requests for information regarding songs; one or more servers may support requests for information regarding voices; and/or one or more servers may support requests for information regarding sound sources (e.g., machine, human, animal, etc.).

The device 10 may be a cellular telephone, a personal digital assistant, a portable video game unit, a two-way radio, a portable video and/or audio player, a portable medical monitoring and/or treatment device, and/or any other handheld electronic device that receives inputs from a user and provides corresponding outputs of audio data, video data, tactile data, text data, graphics data, and/or a combination thereof. In an embodiment, the device 10 includes a processing module 40, a wireless transceiver 44, a primary cue module 34, and a secondary cue module 36. The processing module 40 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-8.

The other device 12, which may be a device similar to that of device 10 or similar to server 20, includes a wireless interface 59, a processing module 56, and memory 58. The wireless interface 59 may be a wireless transceiver for communicating directly with the device 10 or communicating indirectly with device 10 via the wireless router 24, an access point, or some other local network service hub. The processing module 56 may be of a similar construct to that of processing module 40 and, in an embodiment, functions to implement the method of FIG. 8. The memory 58 stores information regarding objects of interest.

The server 20 includes a network and/or wireless interface 55, a processing module 52, and memory 54. The processing module 56 may be of a similar construct to that of processing module 40 and, in an embodiment, functions to implement the method of FIG. 8. The memory 58 stores information regarding objects of interest.

In an example of operation, the user of device 10 would like to obtain information regarding the object of interest 14 (e.g., a person, a building, a landmark, a thing, a mammal, an insect, a reptile, a fish, a song, a plant, a sound source (e.g., a radio broadcast signal, human vocal cords, a speaker, etc.), etc.). In this example, the user causes the primary cue module 34 to obtain primary data 48 (e.g., a digital image, an audio sample, geographic information, a text message, etc.) regarding the object of interest 14 and/or the secondary cue module 36 (e.g., a digital image of the surrounding area, an audio sample, weather information, further location information, a text message, altitude information, frequency spectrum information, acceleration information, compass heading information, date, time of day, etc.) to obtain secondary data 50 regarding the object of interest 14.

The processing module 40 converts the primary data and/or the secondary data into an outbound message (e.g., a request for information regarding the object of interest, the primary data, and/or the secondary data). The processing module 40 then converts the outbound message into an outbound symbol stream in accordance with a wireless communication protocol (e.g., GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), etc.). Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion. The processing module 40 provides the outbound symbol stream to the wireless transceiver 44.

The wireless transceiver 44 includes a receiver section and a transmitter section. The transmitter section converts the outbound symbol stream into an outbound wireless signal that has a carrier frequency within a given frequency band (e.g., 900 MHz, 1800 MHz, 2.4 GHz, 5.5 GHz, 57-66 GHz, etc.), which is transmitted to the other device 12, to the base station 22, and/or to the wireless router 24. In an embodiment, the conversion begins with mixing the outbound symbol stream with a local oscillation to produce an up-converted signal. One or more power amplifiers and/or power amplifier drivers amplifies the up-converted signal, which may be RF bandpass filtered, to produce the outbound wireless signal. In another embodiment, the transmitter section includes an oscillator that produces an oscillation. The outbound symbol stream provides phase information (e.g., +/− Δθ [phase shift] and/or θ(t) [phase modulation]) that adjusts the phase of the oscillation to produce a phase adjusted RF signal, which is transmitted as the outbound wireless signal. In another embodiment, the outbound symbol stream includes amplitude information (e.g., A(t) [amplitude modulation]), which is used to adjust the amplitude of the phase adjusted RF signal to produce the outbound wireless signal.

In yet another embodiment, the transmitter section includes an oscillator that produces an oscillation. The outbound symbol provides frequency information (e.g., +/− Δf [frequency shift] and/or f(t) [frequency modulation]) that adjusts the frequency of the oscillation to produce a frequency adjusted RF signal, which is transmitted as the outbound wireless signal. In another embodiment, the outbound symbol stream includes amplitude information, which is used to adjust the amplitude of the frequency adjusted RF signal to produce the outbound wireless signal. In a further embodiment, the transmitter section includes an oscillator that produces an oscillation. The outbound symbol provides amplitude information (e.g., +/− ΔA [amplitude shift] and/or A(t) [amplitude modulation) that adjusts the amplitude of the oscillation to produce the outbound wireless signal.

The other device 12 and/or server 20 receives an inbound symbol stream that represents the outbound message regarding the object of interest via its corresponding interface 59, 55. The processing module 52 and/or 59 converts the inbound symbol stream into primary data and/or secondary data, and a request for desired information regarding an object of interest in accordance with a wireless protocol (e.g., GSM, CDMA, WCDMA, HSUPA, HSDPA, WiMAX, EDGE, GPRS, IEEE 802.11, Bluetooth, ZigBee, UMTS, LTE, IEEE 802.16, EV-DO, etc.) and/or a wired protocol (e.g., Ethernet, TCP/IP, etc.).

The processing module 52 and/or 56 determines whether a local memory (e.g., memory 54 and/or 58) stores the desired information regarding the object of interest based on the request for the desired information, the primary data, and/or the secondary data. For example, the primary data may be a digital image of a bird, the secondary data may be an audio sample of the bird, and the request is "what is the name of this bird". In this example, the processing module 52 and/or 56 performs a look up table function, or the like, to determine whether its memory 54 and/or 58 includes the requested information. If so, the processing module 52 and/or 56 converts the desired information regarding the object of interest into an outbound symbol stream that is subsequently converted into an inbound wireless signal. Note that the primary and secondary data provides cues as to the object of interest that assists the other device 12 and/or the server 20 in narrowing its search to find the desired information.

The wireless transceiver 44 of the device 10 converts the inbound wireless signal into the inbound symbol stream. This may be done via the receiver section by amplifying the inbound wireless signal to produce an amplified inbound wireless signal. The receiver section then mixes in-phase (I) and quadrature (Q) components of the amplified inbound wireless signal with in-phase and quadrature components of a local oscillation to produce a mixed I signal and a mixed Q signal. The mixed I and Q signals are combined to produce the inbound symbol stream. In this embodiment, the inbound symbol may include phase information (e.g., +/− Δθ [phase shift] and/or θ(t) [phase modulation]) and/or frequency information (e.g., +/− Δf [frequency shift] and/or f(t) [frequency modulation]). In another embodiment and/or in furtherance of the preceding embodiment, the inbound wireless signal includes amplitude information (e.g., +/− ΔA [amplitude shift] and/or A(t) [amplitude modulation]). To recover the amplitude information, the receiver section includes an amplitude detector such as an envelope detector, a low pass filter, etc.

The processing module 40 converts the inbound symbol stream into an inbound message, which includes the information regarding the object of interest. The conversion may be done in accordance with one or more wireless communication standards (e.g., GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), etc.). Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling.

Figure 2:
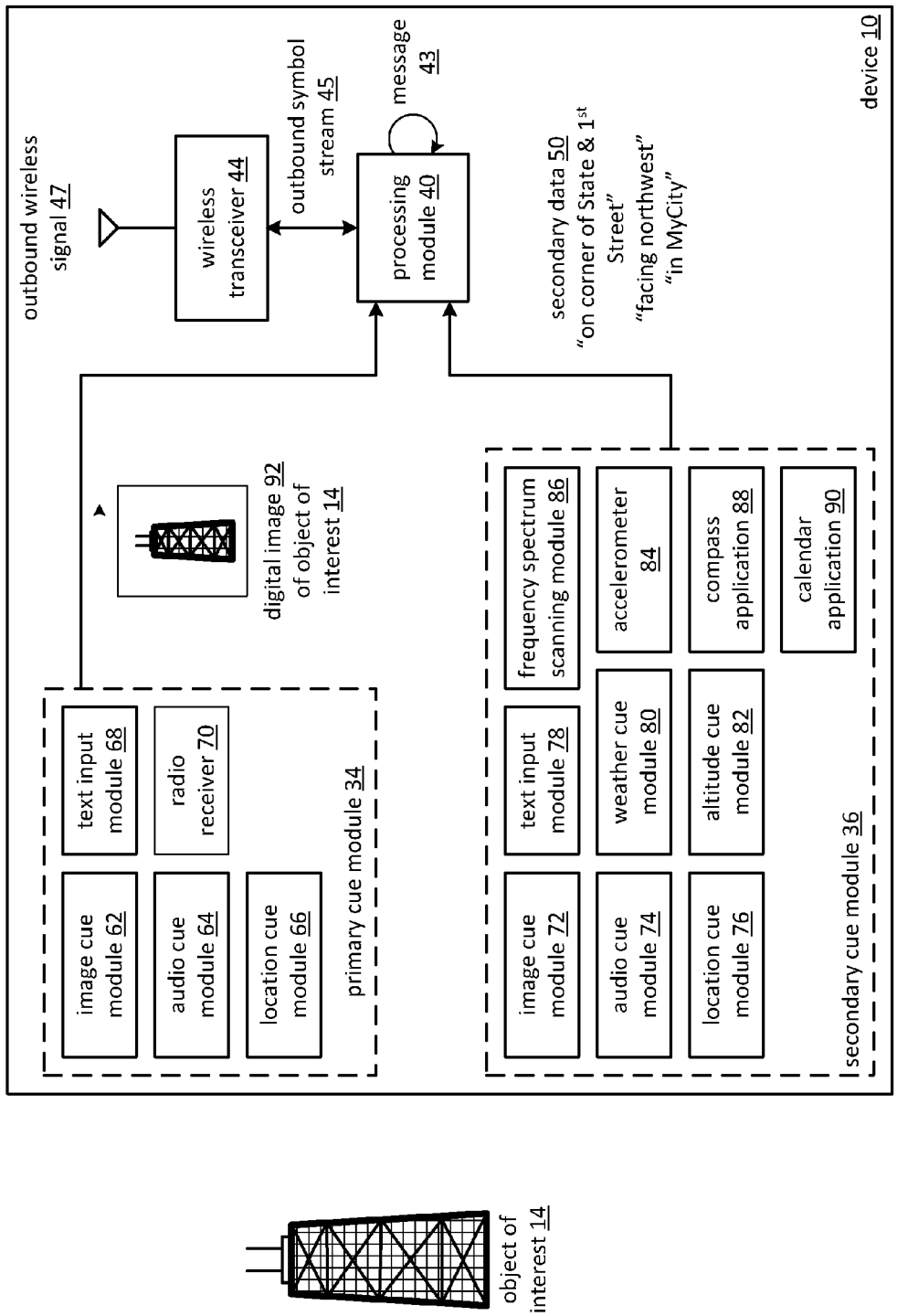
FIG. 2 is a schematic block diagram of an embodiment of a device in accordance with the present invention.

FIG. 2 is a schematic block diagram of an embodiment of the device 10 that includes the processing module 40, the wireless transceiver 44, the primary cue module 34, and the secondary cue module 36. As shown, the primary cue module 34 includes one or more of a plurality of primary cue modules (e.g., an image cue module 62, an audio cue module 64, a location cue module 66, a text input module 68, and/or a radio receiver 70). The secondary cue module 36 includes one or more of a plurality of secondary cue modules (e.g., an image cue module 72, an audio cue module 74, a location cue module 76, a text input module 78, a weather cue module 80, an altitude module 82, a frequency spectrum scanning module 86, a compass application 88, and/or a calendar application 90).

In this example, a building is the object of interest 14. The primary cue module 34 obtains a digital image 92 of the object of interest 14 and provides it to the processing module 40. For example, the digital image cue module 62 may capture the digital image 92 of the building. In addition, the secondary cue module 36 provides the secondary data 50 (e.g., a text or voice message of "on corner of State and 1$^{st}$ Street", a text message, a voice message, or a location message indicating "in My City", and a text message, a voice message, or a heading message output that indicates "facing northwest") to the processing module 40. Note that the text input module 78 may generate the text messages; the audio cue module 74 may generate the voice messages; the location cue module 76, which may be a GPS receiver, may generate the location messages; and the compass application may generate the heading messages.

The processing module 40 processes the primary data 48 (e.g., the digital image 92) and the secondary data 50 (e.g., the messages), and a request for further information to produce an outbound message 43. The processing module 40 then converts the outbound message 43 into an outbound symbol stream 45 as previously described. The wireless transceiver 44 converts the outbound symbol stream 45 into the outbound wireless signal 47 as previously described.

With these cues, the other device 12 and/or the server 20 can narrow its search to buildings in My City near State and 1$^{st}$ Streets, which are northwest from this intersection. This simplifies the search as well as improves the accuracy of search. For example, many buildings within a city and/or from city to city may look alike, the additional cues enable the search engine of the device 12 and/or server 20 to correctly identify the building and retrieve the corresponding information.

In another example, a bird is the object of interest 14. The primary cue module 34 obtains a digital image of the bird and provides it to the processing module 40. In addition, the secondary cue module 36 provides the secondary data 50 (e.g., another digital image of the tree in which the bird is sitting; an audio recording of the bird signing; a text message, a voice message, or a weather message indicating "in National Park"; a text message, a voice message, or a location message indicating "weather conditions"; a text message, a voice message, or an altitude message indicating "altitude at 9,000 feet"; and/or a text message, a voice message, or a calendar message indicating "January") to the processing module 40. Note that the image cue module 72 may generate the digital image of the tree; the audio cue module 74 may generate the audio recording; the weather cue module 80 may generate the weather condition message (e.g., temperature, barometric pressure, humidity, etc.); the calendar application may generate the message, etc.

In another example, a recently played song on a radio station is an object of interest 14. In this example, the primary cue module 34 may provide an audio sample of the song and/or provide a message (text or voice) indicating the radio station. The secondary cue module 36 may provide the time the song of interest was played, another known song that was played prior, or subsequent, to the song of interest, etc.

The processing module 40 may further process the primary data and/or secondary data to determine which other device 12 and/or server 20 to send the outbound message. For example, if the processing module 40 determines that the primary data is regarding a building, it may determine that a particular server primarily supports information regarding buildings. As another example, the processing module 40 may determine that the primary data is concerning a bird and may direct the outbound message to a server that primarily provides information regarding birds.

Figure 3:
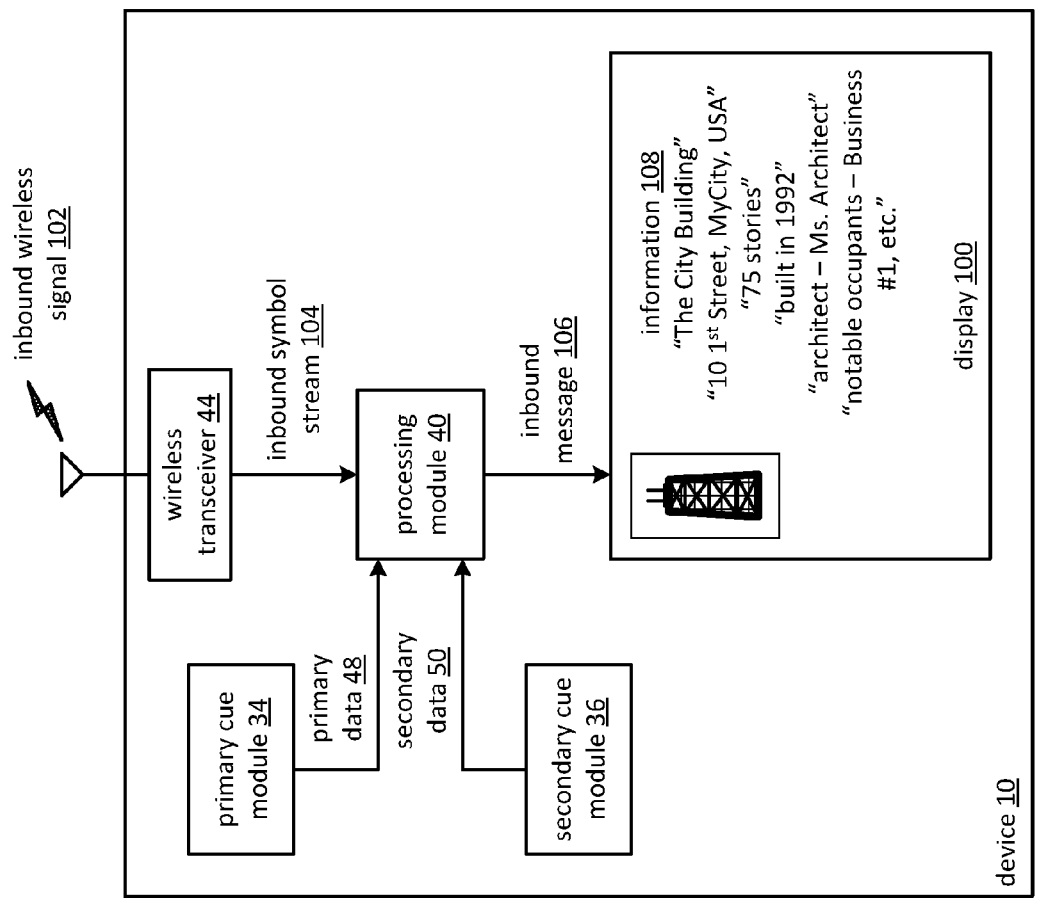
FIG. 3 is a schematic block diagram of another embodiment of a device in accordance with the present invention.

FIG. 3 is a schematic block diagram of another embodiment of a device 10 that includes the processing module 40, the wireless transceiver 44, the primary cue module 34, the secondary cue module 36, and a display 100. The display 100 may be a liquid crystal display, a plasma display, a touch screen display, a capacitive touch screen display, etc.

In this illustration, the other device 12 and/or the server 20 has responded to the devices request for information regarding the object of interest via an wireless signal 102. The wireless transceiver 44 converts the inbound wireless signal 102 into an inbound symbol stream 104. The processing module 40 converts the inbound symbol stream 104 into an inbound message 106, which contains the information 108 regarding the object of interest 14. For example, the information 108 may include the name of the building (e.g., The City Building"), the address of the building (e.g., 10 1$^{st}$ Street, My City, USA), the number of stories (e.g., 75 stories), the year the building was built (e.g., built in 1992), the name of the architect (e.g., Ms. Architect), and notable occupants of the building (e.g., Business #1, etc.).

If the information 108 includes what the user was looking for, then the process is complete for this request for the particular object of interest. If, however, the user of the device 10 desires further information, he or she may cause the device 10 to send another request for further information. The device 10 would process the subsequent request in a similar manner as it did the initial request.

Figure 4:
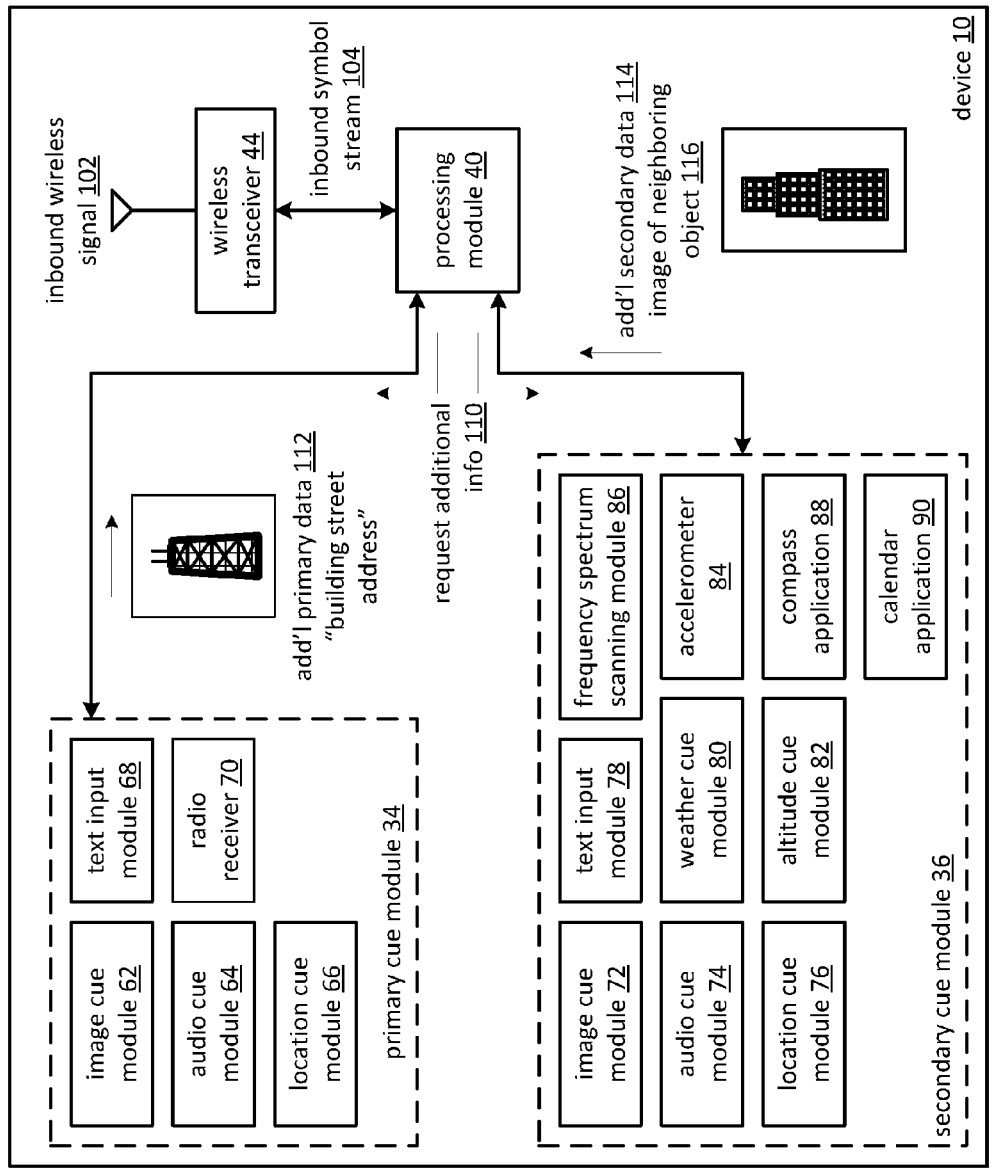
FIG. 4 is a schematic block diagram of another embodiment of a device in accordance with the present invention.

FIG. 4 is a schematic block diagram of another embodiment of a device 10 that includes the processing module 40, the wireless transceiver 44, the primary cue module 34, the secondary cue module 36, and a display 100. In this embodiment, the other device 12 and/or the server 20 has transmitted a request for additional information from the device 10 via a wireless signal 102. The wireless transceiver 44 converts the inbound wireless signal 102 into an inbound symbol stream 104. The processing module 40 converts the inbound system stream 104 into the request for additional information 110.

The processing module 40 also interprets the request 110 to determine whether additional primary data is being request and/or whether additional secondary data is being requested. The processing module 40 may also determine the type of data to collected (e.g., additional digital images, a response to a text message, etc.). In this example, both primary and secondary data are being requested. Accordingly, the processing module 40 provides the request to the primary cue module 34 and to the secondary cue module 36.

The primary cue module 34, utilizing one or more of its modules 62-70, generates additional primary data 112. In this example, the additional primary data 112 includes the building's street address. Similarly, the secondary cue module 36, using one or more of its modules 72-90, generates additional secondary data 114. In this example, the additional secondary data is an image of a neighboring object 116 (e.g., an adjacent building).

The processing module 40 converts the additional primary and secondary data into an outbound message, which further includes an indication that the data is in response to a request for further information. The processing module 40 converts the outbound message into an outbound symbol stream, which the wireless transceiver 44 converts into an outbound wireless signal.

Figure 5:
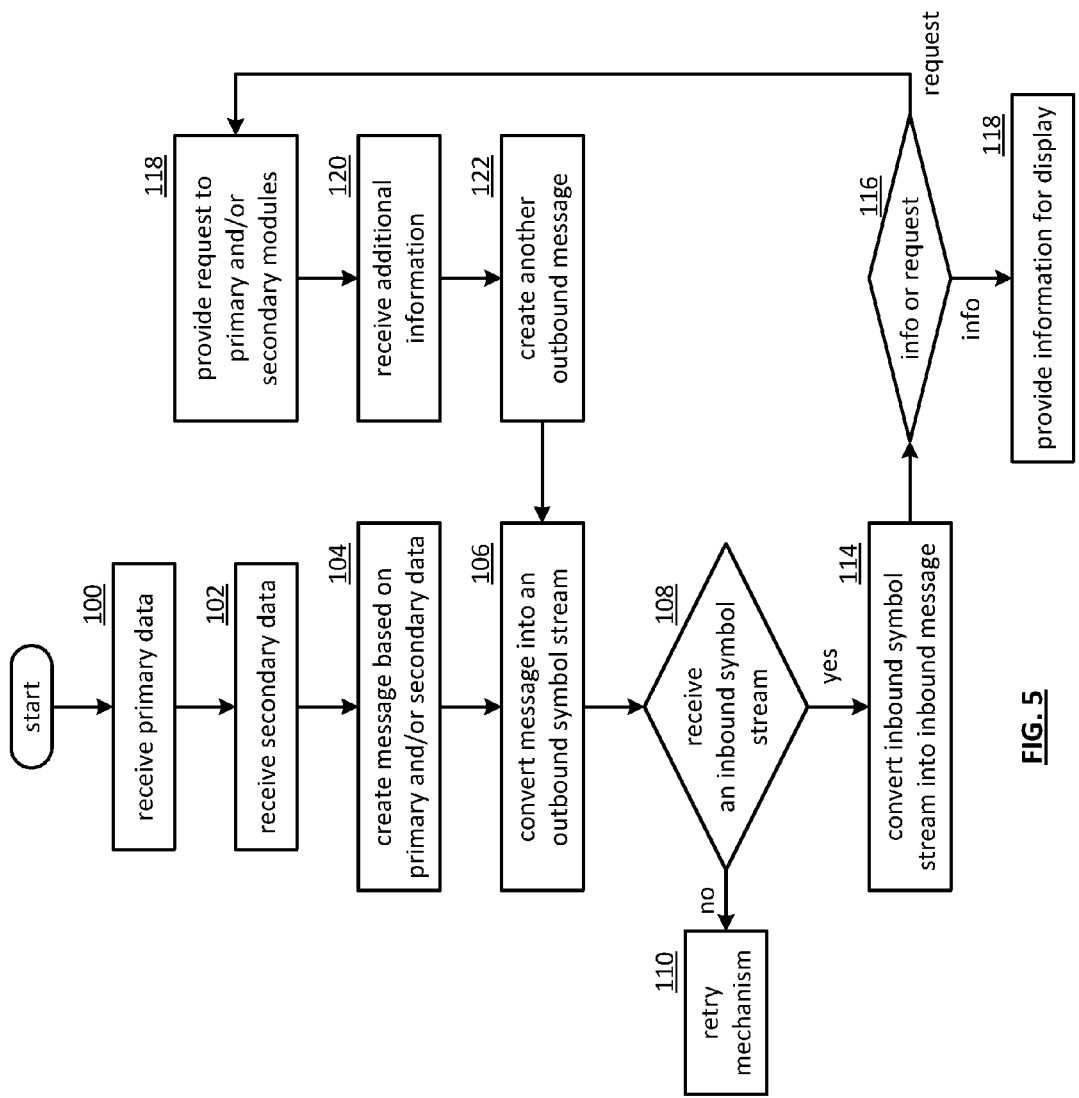
FIG. 5 is a logic diagram of an embodiment of a method for obtaining information regarding an object of interest in accordance with the present invention.

FIG. 5 is a logic diagram of an embodiment of a method for obtaining information regarding an object of interest (e.g., a person, a building, a landmark, a thing, a mammal, an insect, a reptile, a fish, a song, a plant, and a sound source) that begins at step 100 where the processing module 40 receives primary data (e.g., one or more of: a digital image, a digital audio file, a radio broadcast signal, location information, a text message, etc.) from the primary cue module. The method continues at step 102 where the processing module receives secondary data (e.g., one or more of: a digital image, a digital audio file, location information, a text message, weather information, altitude, acceleration, frequency spectrum information, compass heading, date, time, etc.) from the secondary cue module. Note that steps 100 and 102 may be performed concurrently or in a reverse order. Further note that step 100 may be skipped such that the processing module receives the secondary data.

The method continues at step 104 where the processing module 40 creates an outbound message based on the primary and/or secondary data. For example, the outbound message may include a request for information regarding the object of interest and the secondary data (e.g., a text and/or voice message "what is the name of the building on the corner of State and $1^{st}$ Street in My City"). As another example, the outbound message may include the request for information, the primary data (e.g., a digital image of the building), and the secondary data (e.g., State and $1^{st}$ Street, etc.).

The method continues at step 106 where the processing module converts the outbound message into an outbound symbol stream, which may be done in accordance with one or more wireless communication standards. The method continues at step 108 where the processing module determines whether it has received an inbound symbol stream in response to the request for information. If not, the method continues at step 110 where the processing module evokes a retry mechanism.

If, however, the processing module receives the inbound symbol stream, the method continues at step 114 where the processing module converts the inbound symbol stream into an inbound message. The method continues at step 116 where the processing module determines whether the inbound message includes the information or a request for additional information. If the message includes the information, the method continues at step 118 where the processing module provides the information for display.

If, however, the message is a request for additional information, the method continues at step 118 where the processing module provides the request to the primary and/or secondary cue modules. The method continues at step 120 where the processing module receives the additional primary and/or secondary data. The method continues at step 122 where the processing module creates another outbound message that contains the additional primary and/or secondary data and an indication that the message is in response to a request for additional information. The method then repeats at step 106.

In this method, the collection of primary data, secondary data, additional primary data, and/or additional secondary data may be from one or more of the primary cue modules and/or from one or more of the secondary cue modules (examples of each are shown in FIG. 2). The selection of which primary cue module(s) and/or secondary cue module(s) to use may be user driven or automated. For example, when a particular primary cue module is used, the device 10 determines that one or more specific secondary cue modules are to be used. For example, the primary cue module may be a digital image sensor and the secondary cue module may be a GPS receiver and a text message.

Figure 6:
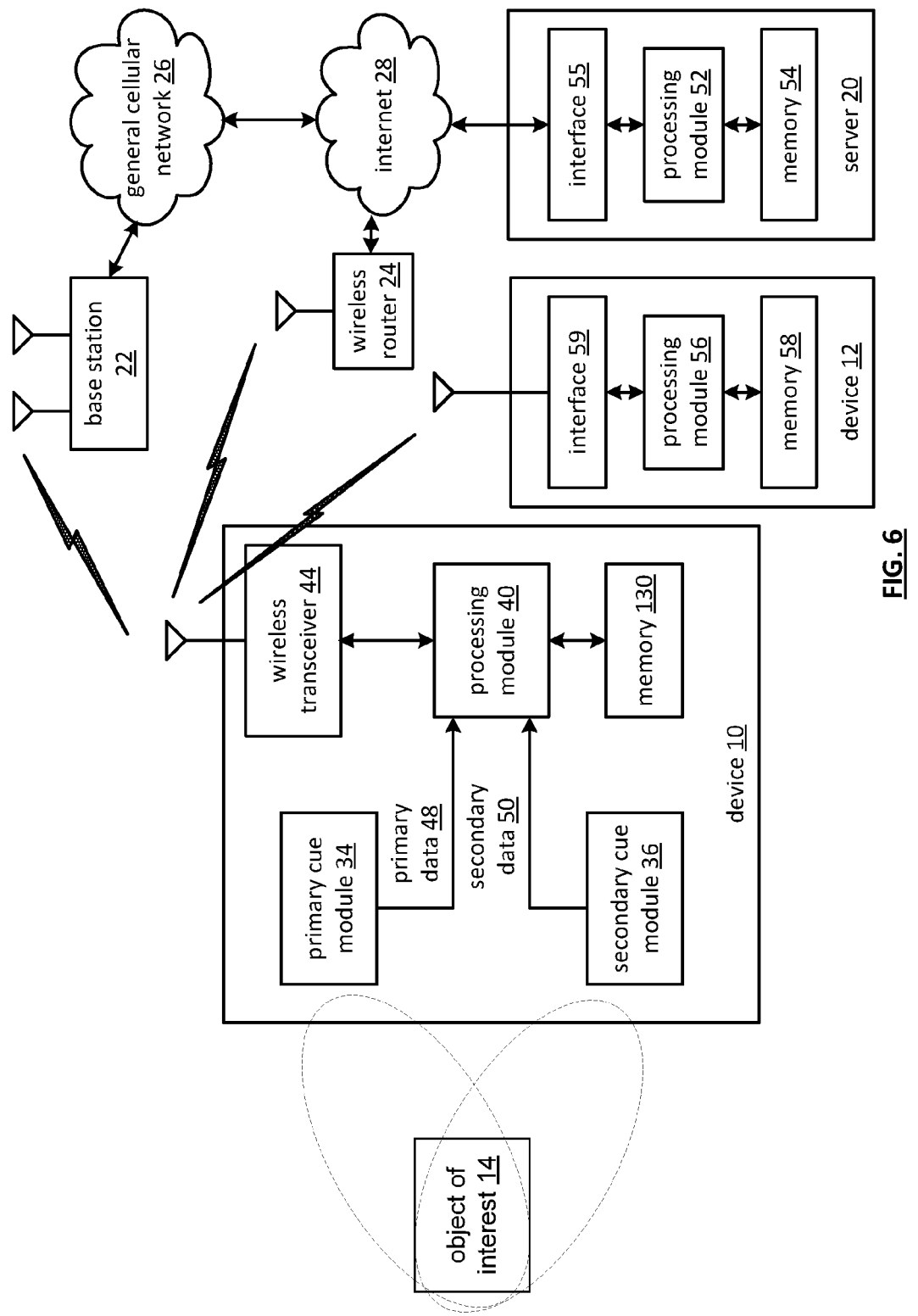
FIG. 6 is a schematic block diagram of another embodiment of a system in accordance with the present invention.

FIG. 6 is a schematic block diagram of an embodiment of a system in which a device 10 may obtain information regarding an object of interest 14 from another device 12 and/or from a server 20. The device 10 may communicate with the other device 12 and/or the server 20 via a direct wireless connection, via a wireless router 24, via a cellular telephone base station 22, via a general cellular network 26, and/or via the internet 28 as previously discussed with reference to FIG. 1. The device 10 includes the processing module 40, the wireless transceiver 44, the primary cue module 34, the secondary cue module 36, and memory 130 (e.g., RAM, ROM, flash, hard disk, etc.).

In an example of operation, the user of device 10 would like to obtain information regarding the object of interest 14 (e.g., a person, a building, a landmark, a thing, a mammal, an insect, a reptile, a fish, a song, a plant, a sound source (e.g., a radio broadcast signal, human vocal cords, a speaker, etc.), etc.). In this example, the user causes the primary cue module 34 to obtain primary data 48 (e.g., a digital image, an audio sample, geographic information, a text message, etc.) regarding the object of interest 14 and/or the secondary cue module 36 (e.g., a digital image of the surrounding area, an audio sample, weather information, further location information, a text message, altitude information, frequency spectrum information, acceleration information, compass heading information, date, time of day, etc.) to obtain secondary data 50 regarding the object of interest 14.

The processing module 40 determines whether the memory 130 stores the desired information regarding the object of interest 14 based on the primary data and/or the secondary data. In an embodiment, the processing module 40 interprets the primary and/or secondary data to determine database search information (e.g., building information regarding a building in a particular city, etc). The processing module 40 searches one or more databases stored in memory 130 to determine whether the memory 130 stores the desired information. If so, the processing module 40 retrieves the information and provides it to the display for presentation to the user.

If, however, the memory 130 stores only a portion of the desired information, the processing module 40 generates an outbound message requesting the additional information based on the information it has retrieved, the primary data, and/or the secondary data. The processing module and the wireless transceiver 44 generate an outbound wireless signal from the outbound message as previously discussed. When the processing module receives a response to its request, it interprets the message to determine whether it includes the requested information or a request for additional data.

If the response includes the requested information, the processing module augments the information from memory 130 with the requested information and provides the aggregated information to the display for presentation to the user. If the response includes a request for additional information, the processing module processes the request as previously discussed.

If the memory 130 does not store the desired information or a portion thereof, the processing module generates the outbound message to include the primary data and/or the secondary data and a request for the desired information into an outbound message. The remaining processing to obtain the desired information is as previously discussed.

Figure 7:
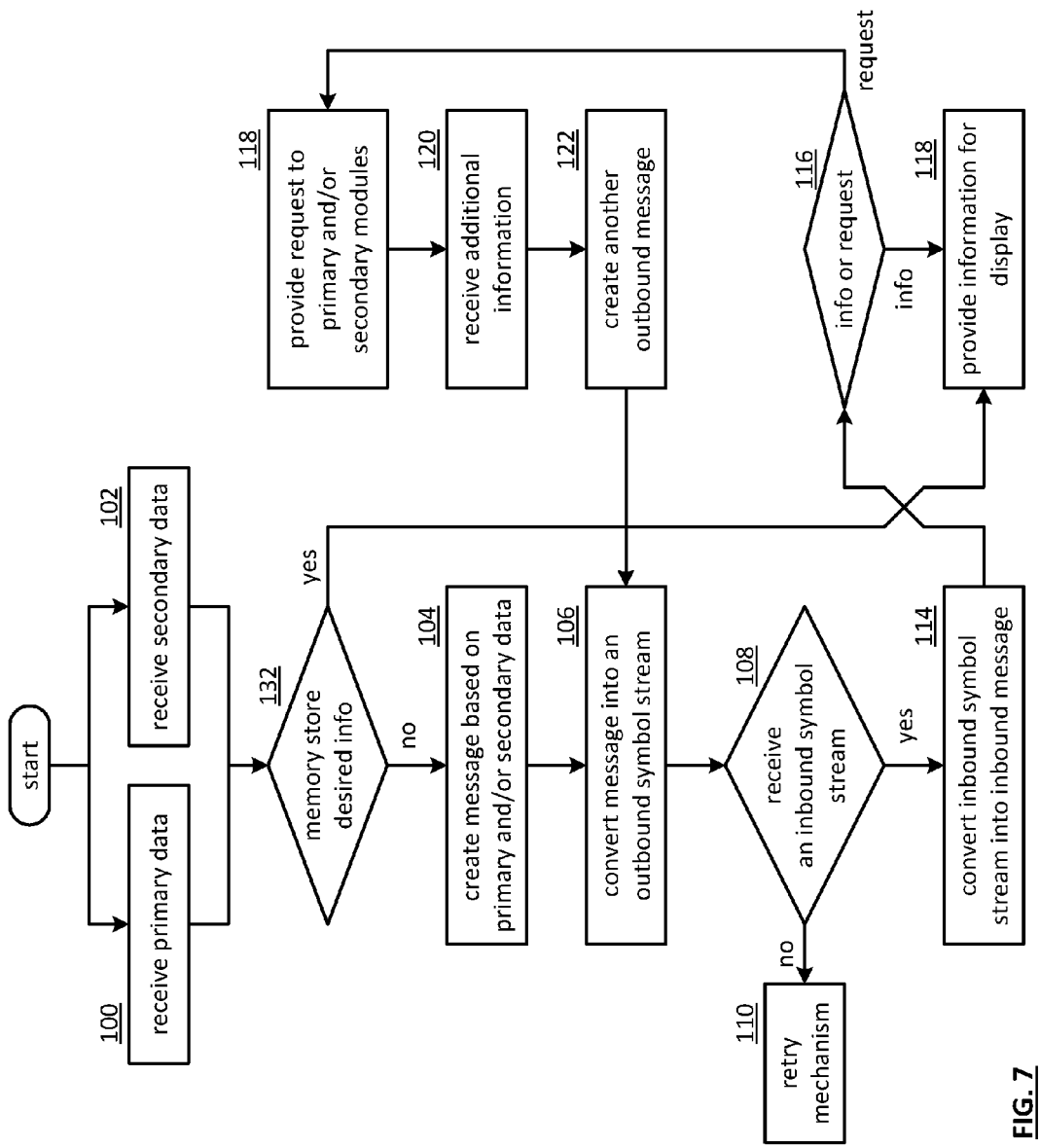
FIG. 7 is a logic diagram of another embodiment of a method for obtaining information regarding an object of interest in accordance with the present invention.

FIG. 7 is a logic diagram of another embodiment of a method for obtaining information regarding an object of interest (e.g., a person, a building, a landmark, a thing, a mammal, an insect, a reptile, a fish, a song, a plant, and a sound source) that begins at steps 100 and/or 103 where the processing module 40 receives primary data (e.g., one or more of: a digital image, a digital audio file, a radio broadcast signal, location information, a text message, etc.) from the primary cue module and/or receives secondary data (e.g., one or more of: a digital image, a digital audio file, location information, a text message, weather information, altitude, acceleration, frequency spectrum information, compass heading, date, time, etc.) from the secondary cue module.

Note that step 100 may be skipped such that the processing module receives the secondary data.

The method continues at step 132 where the processing module determines whether the memory stores the desired information. If yes, the method continues at step 118 where the processing provides the information for display. If, however, the processing determines that the memory does not store the desired information or stores only a portion thereof, the method continues at step 104 where the processing module 40 creates an outbound message based on the primary data, the secondary data, and/or a request for additional information to augment the information stored in the memory.

The method continues at step 106 where the processing module converts the outbound message into an outbound symbol stream, which may be done in accordance with one or more wireless communication standards. The method continues at step 108 where the processing module determines whether it has received an inbound symbol stream in response to the request for information. If not, the method continues at step 110 where the processing module evokes a retry mechanism.

If, however, the processing module receives the inbound symbol stream, the method continues at step 114 where the processing module converts the inbound symbol stream into an inbound message. The method continues at step 116 where the processing module determines whether the inbound message includes the information or a request for additional information. If the message includes the information, the method continues at step 118 where the processing module provides the information for display.

If, however, the message is a request for additional information, the method continues at step 118 where the processing module provides the request to the primary and/or secondary cue modules. The method continues at step 120 where the processing module receives the additional primary and/or secondary data. The method continues at step 122 where the processing module creates another outbound message that contains the additional primary and/or secondary data and an indication that the message is in response to a request for additional information. The method then repeats at step 106.

Figure 8:
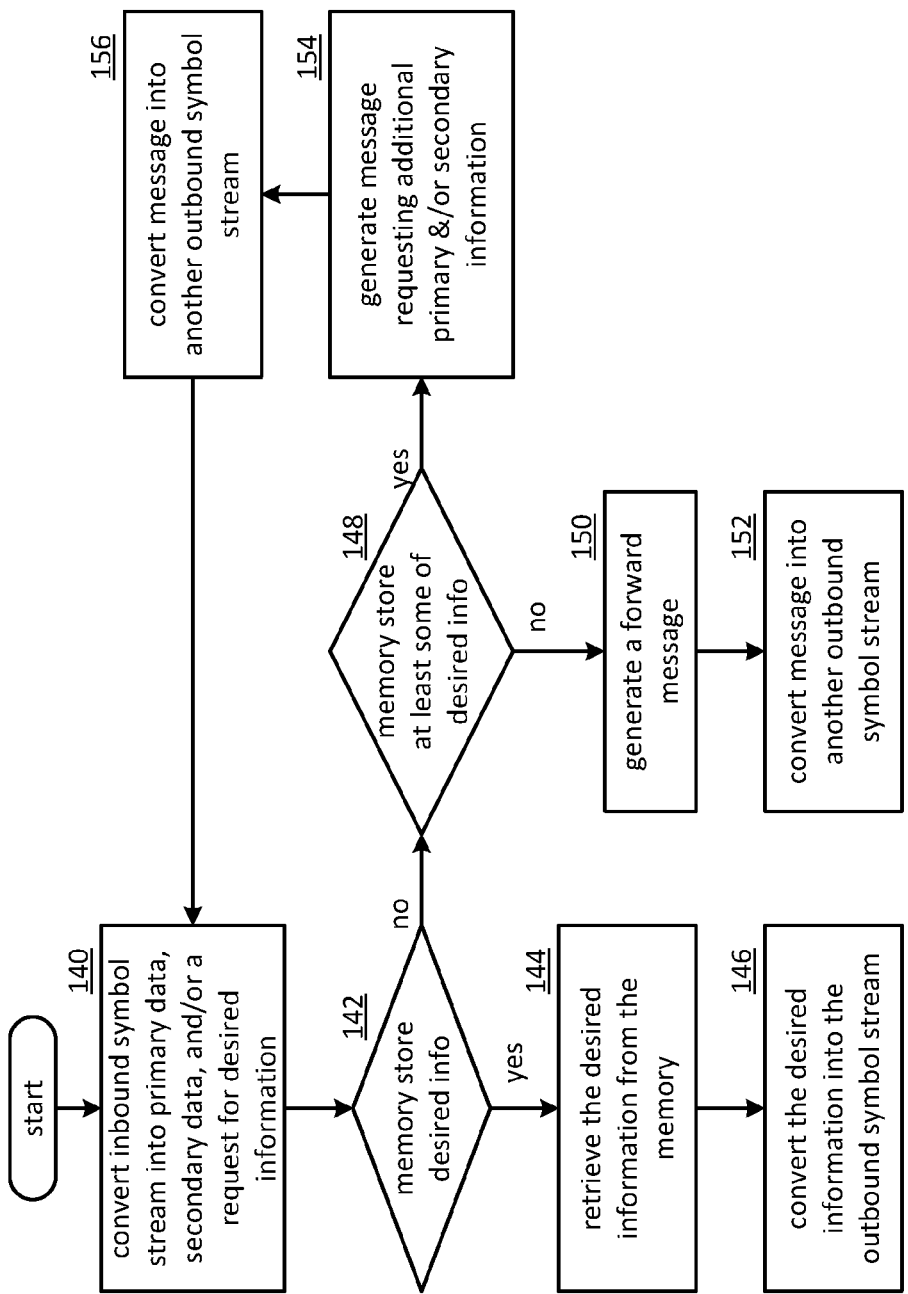
FIG. 8 is a logic diagram of an embodiment of a method for providing information regarding an object of interest in accordance with the present invention.

FIG. 8 is a logic diagram of an embodiment of a method for providing information regarding an object of interest that begins at step 140 where the processing module 52 and/or 56 converts an inbound symbol stream into at least one of primary data, secondary data, and a request for desired information regarding an object of interest in accordance with one or more wireless communication protocols and/or internet protocols.

The method continues at step 142 where the processing module 52 and/or 56 determines whether its memory 54 and/or 58 stores the desired information regarding the object of interest based on the at least one of the request for the desired information, the primary data, and the secondary data. If yes, the method continues at step 144 where the processing module 54 and/or 58 retrieves the desired information from the memory. In an embodiment, the processing module accesses the memory based on the request for the desired information, the primary data, and/or the secondary data to retrieve a plurality of probable information records. The processing module then ranks the plurality of probable information records based on the primary data and/or the secondary data to produce a plurality of ranked probable information records. The processing module then converts the plurality of ranked probable information records into the outbound symbol stream, which is subsequently converted into an outbound wireless signal that is transmitted to the device 10.

If, however, the memory does not store the desired information, the method continues at step 148 where the processing module 54 and/or 58 determines whether the memory stores at least some of the desired information. If yes, the method continues at step 154 where the processing module 54 and/or 58 generates a message requesting additional primary data and/or additional secondary data. The method continues at step 156 where the processing module 54 and/or 58 converts the message into a second outbound symbol stream and then waits for a response at step 140.

If, at step 148, the memory does not store any of the desired information, the method continues at step 150 where the processing module 54 and/or 58 generates a forward message that includes at least one of the primary data, the secondary data, the request for the desired information, an identity of a requestor, and an indication of the desired information. The method continues at step 152 where the processing module 54 and/or 58 converts the forward message into a second outbound symbol stream.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A mobile communications device comprising:
    a processor operably coupled to a plurality of cue generators to collect a plurality of cues about an object of interest external to the mobile communications device, the processor determining one or more remote searchable databases to search based on the collected plurality of cues about the object of interest;
    a wireless transmitter operably coupled to the processor to transmit an outbound wireless message including the collected plurality of cues and a request for additional information about the object of interest from the one or more remote searchable databases, the collected plurality of cues narrowing a search of the one or more remote searchable databases;
    a wireless receiver operably coupled to the processor to receive an inbound wireless message containing one or more parts of the requested additional information; and
    a display to present the received one or more parts of the requested additional information.

2. The mobile communications device of claim 1, wherein at least one of the plurality of cues comprises an image of the object of interest, the image created by the mobile communications device.

3. The mobile communications device of claim 2, wherein at least one of the plurality of cues comprises additional cues about the image created by the mobile communications device.

4. The mobile communications device of claim 1, wherein at least one of the plurality of cues comprises an image of an object neighboring the object of interest, the image created by the mobile communications device.

5. The mobile communications device of claim 1, wherein the plurality of cues are automatically selected by the processor.

6. The mobile communications device of claim 1, wherein the plurality of cues comprise additional cues requested by the inbound wireless message.

7. The mobile communications device of claim 1, wherein the plurality of cue generators comprise:
    a primary cue generator including at least one of:
        one or more digital image cue generators;
        one or more sound cue generators;
        a radio receiver;
        one or more location cue generators; and
        a text input generator, and
    a secondary cue generator, different from the primary cue generator, including at least one of:
        one or more digital image cue generators;
        one or more sound cue generators;
        one or more location cue generators;
        a text input generator;
        one or more weather cue generators;
        one or more altitude cue generators;
        one or more accelerometers;
        one or more frequency spectrum scanning generators;
        a compass application; and
        a calendar application.

8. The mobile communications device of claim 1, wherein the object of interest comprises at least one of: a person, a building, a landmark, a thing, a mammal, an insect, a reptile, a fish, a song, a plant, and a sound source.

9. A method performed by a mobile communications device, the method comprising:
    collecting a plurality of cues about an object of interest, the object of interest external to the mobile communications device, the mobile communications device determining one or more remote searchable databases to search;
    transmitting a request for additional information about the object of interest from the one or more remote searchable databases, the request including the collected plurality of cues to narrow a search of the one or more remote searchable databases;
    receiving one or more parts of the requested additional information; and
    displaying the one or more parts of the requested information.

10. The method of claim 9, wherein the plurality of cues are automatically selected by the mobile communications device.

11. The method of claim 9, wherein the plurality of cues comprise additional cues requested by a processor coupled to the remote searchable databases.

12. The method of claim 9, wherein the step of collecting a plurality of cues about an object of interest comprises creating at least a primary cue and one or more secondary cues.

13. The method of claim 9, wherein at least one of the plurality of cues comprises an image of the object of interest, the image created by the mobile communications device.

14. The method of claim 13, wherein the at least one of the plurality of cues comprises additional cues about the image created by the mobile communications device.

15. The method of claim 9, wherein the at least one of the plurality of cues comprises an image of an object neighboring the object of interest, the image created by the mobile communications device.

16. The method of claim 9 further comprising automatically selecting the plurality of cues.

17. The method of claim 9 further comprising the collecting of plurality of cues including collection from any of:
    one or more digital image cue generators;
    one or more sound cue generators;
    a radio receiver;
    one or more location cue generators;
    a text input generator;
    one or more weather cue generators;
    one or more altitude cue generators;
    one or more accelerometers;
    one or more frequency spectrum scanning generators;
    a compass application; and
    a calendar application.

18. An information distribution device comprising:
    a wireless interface for receiving at least one wireless request message from a mobile communications device, the at least one request messages comprising at least a plurality of cues about an object of interest, external to and selected by the mobile communications device and a request for additional information about the object of interest;

a processor configured to process the at least a plurality of cues and request for additional information, the processor further configured to search operably connected memory for the additional information, retrieve a plurality of probable information records, rank the plurality of probable information records based on at least a first and a second one of the plurality of cues to produce a plurality of ranked probable information records, and convert the plurality of ranked probable information records into data within a wireless response message; and a transmitter operably coupled to the processor to transmit the wireless response message to the mobile communications device containing one or more parts of the requested additional information.

19. The information distribution device of claim 18, wherein the processor is further configured to, when the operably connected memory contains less than requested additional information, generate an additional wirelessly transmitted message requesting at least one additional cue.

20. The information distribution device of claim 19, wherein the processor is further configured to, when receiving the at least one additional cue, searching the operably connected memory using the first, the second, and at least one additional cues to locate the additional information.

* * * * *